O. J. LARAVIE.
CUSHIONING BICYCLE FRAME.
APPLICATION FILED OCT. 22, 1908.
931,932.
Patented Aug. 24, 1909.
2 SHEETS—SHEET 2.
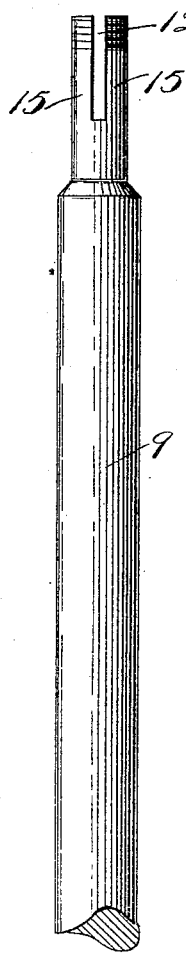
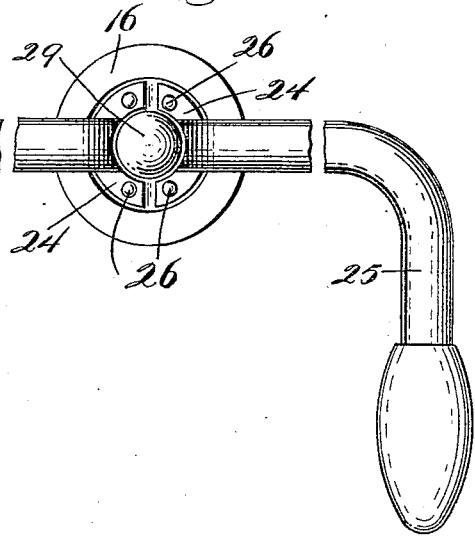
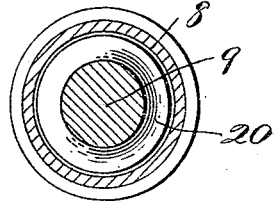
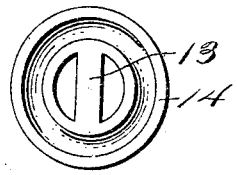
Inventor
Oscar J. Laravie.
Witnesses

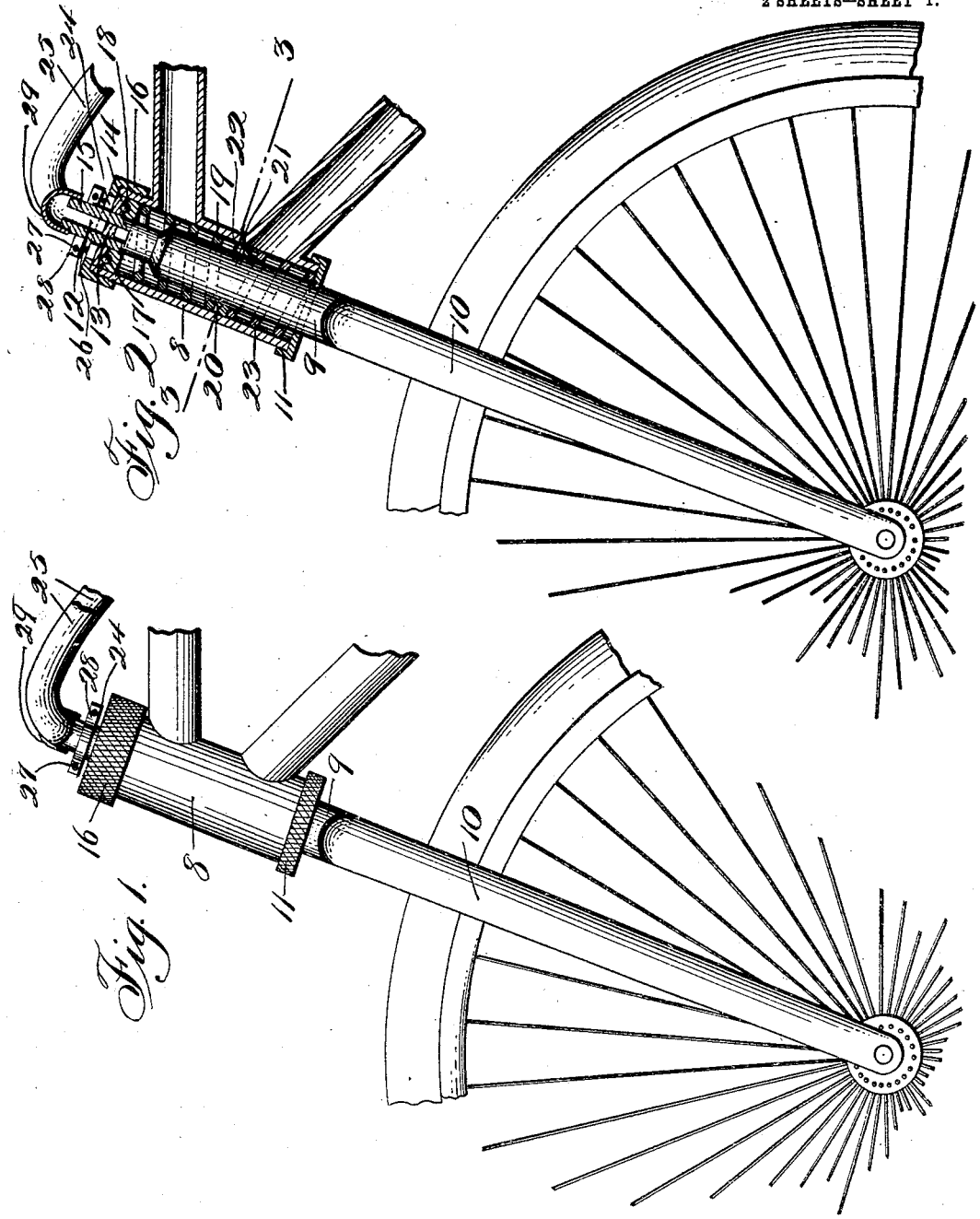

UNITED STATES PATENT OFFICE.

OSCAR J. LARAVIE, OF PLATTSBURG, NEW YORK.

CUSHIONING BICYCLE-FRAME.

931,932. Specification of Letters Patent. Patented Aug. 24, 1909.

Application filed October 22, 1908. Serial No. 458,998.

*To all whom it may concern:*

Be it known that I, OSCAR J. LARAVIE, a citizen of the United States, residing at Plattsburg, in the county of Clinton, State of New York, have invented certain new and useful Improvements in Cushioning Bicycle-Frames; and I do hereby declare the following to be a full, clear, and exact description of the invention, such as will enable others skilled in the art to which it appertains to make and use the same.

The invention relates to a cushioned frame and more particularly to bicycles and other velocipedes having a wheeled spring fork.

The primary object of the invention is the provision of a cushion connection between the fork and the steering head of the bicycle frame, which while possessing the necessary rigidity to sustain the weight of the rider and wear when in use, is at the same time adapted to take up sudden shocks and yield when the wheel strikes obstructions, thus relieving the rider from resulting jars and vibrations.

Another object of the invention is the provision of a cushion means interposed between the fork and bicycle head which will prevent undue strain or breakage of the forks, and also add to the comfort of the rider while it is at the same time simple in construction, compact, thoroughly efficient in operation and inexpensive in the manufacture.

With these ends in view the invention for example consists in the construction, combination and arrangement of elements hereinafter fully described and brought out in the appended claims and illustrated in the accompanying drawings.

It is to be understood that changes, variations and modifications may be made such as come properly within the scope of the claims hereunto appended without departing from the spirit of the invention.

In the drawings: Figure 1 is a fragmentary side elevation of the front fork and steering head of a bicycle embodying the invention. Fig. 2 is a longitudinal sectional view through the steering head. Fig. 3 is a transverse sectional view on the line 3—3 of Fig. 1. Fig. 4 is a fragmentary front elevation of the fork removed from the bicycle head. Fig. 5 is a top plan view of the handle bars. Fig. 6 is a bottom plan view of the cone.

Similar reference characters indicate corresponding parts throughout the several views in the drawings.

In the drawings, the numeral 8 designates a hollow tubular steering head of the bicycle and 9 the stem or steering spindle of the front fork 10 journaled in the steering head. In the lower end of the steering head 8 is threaded a perforated nut 11 centering the lower end of the said stem or spindle 9 within the said steering head and which stem or spindle is bifurcated as at 12 at its upper end to receive a cross bridge piece or bar 13 of a loose cone 14 mounted in the upper end of the steering head 8, which cone contains at opposite sides of the bridge bar 13 suitable openings in which loosely play for longitudinal displacement the split extensions 15 of the stem 9 of the front fork.

Surrounding the upper end of the steering head 8 and securing the cone 14 in position therein is a threaded binding collar or lock nut 16. Immediately below the cone 14 within the steering head 8 is an annular grooved ball cup 17 receiving a series of balls 18 the latter working against the under face of the said cone 14 and bearing against the said cup 17 is one end of a coiled expansion spring 19 the latter surrounding a stem or spindle 9 a considerable distance of its length and having the other extremity bearing against a collar 20 fixed to the stem or spindle 9 by a screw fastener 21, which collar is formed with opposed concaved faces 22 the upper one of which receives the lower end of the spring 19 while the other forms a seat or bearing for one end of a cushioning spring 23, the opposite end of which has its bearing against the nut 11 in the lower end of the steering head.

The split extensions 15 of the stem or spindle 9 protrude a distance beyond the outer face of the cone 14 and is surrounded by the lower extremities 24 of a two-part handle bar 25 which lower extremities 24 are secured directly to the cone 14 by fasteners 26 and also surrounding the said extremities is a split clamp 27 carrying bolt fasteners 28 to hold the latter locked about the lower extremities of the handle bar. On the upper free end of the stem or spindle 9 and receiving the extensions 15 is a screw threaded cap 29 to limit the downward displacement of the stem or spindle 9 within the steering head. It is obvious that the said stem or spindle 9 is capable of longitudinal displacement within the steering head and is controlled in such movement by the springs 19 and 23 respectively, and rotary movement is imparted thereto by turning the handle bar 25 which latter is directly connected to the cone 14 having its cross bar or bridge piece 13 engaging the bifurcation in the upper end of the stem or spindle 9 of the front fork of the bicycle.

When the rider is mounted on the bicycle the spring 19 is compressed more or less and should any sudden shocks or vibrations be imparted to the front fork 10 the same will be relieved or taken up by the cushioning spring 23 thus relieving discomfort to the rider of the bicycle. Should the front fork receive an extraordinary shock for instance by a collision or by the front wheel running violently against an obstruction the resistance of the cushioning spring 23 will be overcome and the spring 19 will come into action to resist and ease the shock.

What is claimed is—

1. The combination of a wheeled fork, a steering head receiving the same, a cone rotatably mounted in the head and engaging the stem of the fork to permit longitudinal displacement thereof, a centering nut carried by the steering head and surrounding the stem of the fork, and cushioning means mounted within the steering head and operative upon said fork.

2. The combination of a steering head, a wheeled fork having a stem mounted within said head, means mounted in the lower end of said head to center said stem within the same, a collar fixed to said stem, a cone mounted at the opposite end of the steering head and engaging said stem to rotate therewith and to permit longitudinal displacement of the latter, and cushioning means disposed between said cone, fixed collar and centering nut.

3. The combination of a steering head, a wheeled fork having a stem mounted within said head, means mounted in the lower end of said head to center said stem within the same, a collar fixed to said stem, a cone mounted at the opposite end of the steering head and engaging said stem to rotate therewith and to permit longitudinal displacement of the latter, cushioning means disposed between said cone, fixed collar and centering nut, and a handle bar fixed to said cone.

4. The combination of a steering head, a wheeled fork having a stem mounted within said head, means mounted in the lower end of said head to center said stem within the same, a collar fixed to said stem, a cone mounted at the opposite end of the steering head and engaging said stem to rotate therewith and to permit longitudinal displacement of the latter, cushioning means disposed between said cone, fixed collar and centering nut, a handle bar fixed to said cone, and ball bearings contained within the steering head and working against the cone.

5. The combination of a steering head, a wheeled fork having a stem rotatably mounted within the steering head and containing a bifurcation in its upper end, a centering member surrounding the stem and secured to the steering head, a cone loosely mounted in the steering head and having a bridge piece engaging the bifurcated upper end of the stem, a collar fixed to said stem, a cushioning spring having its bearing against said collar and said member, an expansion spring interposed between the cone and said fixed collar, a two part handle bar surrounding the stem and secured to the cone, a lock clamp surrounding the two-part handle bar, and ball bearings disposed within the steering head and working against the cone.

In testimony whereof, I affix my signature, in presence of two witnesses.

OSCAR J. LARAVIE.

Witnesses:
HERBERT L. SCRIBNER,
JOHN PARDY.